(12) United States Patent  
Simmons et al.

(10) Patent No.: US 7,018,445 B2  
(45) Date of Patent: Mar. 28, 2006

(54) POLYIMIDE BLENDS FOR GAS SEPARATION MEMBRANES

(75) Inventors: John W. Simmons, Wilmington, DE (US); Okan Max Ekiner, Wilmington, DE (US)

(73) Assignee: L'Air Liquide, Societe Anonyme a Directoire et Conseil de Surveillance Pour l'Etude et l'Exploitation des Procedes Georges Claude, Paris (FR)

( * ) Notice: Subject to any disclaimer, the term of this patent is extended or adjusted under 35 U.S.C. 154(b) by 164 days.

(21) Appl. No.: 10/642,407

(22) Filed: Aug. 15, 2003

(65) Prior Publication Data

US 2004/0107830 A1 Jun. 10, 2004

Related U.S. Application Data

(60) Provisional application No. 60/430,275, filed on Dec. 2, 2002.

(51) Int. Cl.  
*B01D 53/22* (2006.01)  
*B01D 69/08* (2006.01)  
*B01D 71/64* (2006.01)

(52) U.S. Cl. ............. 95/51; 95/45; 96/8; 96/10; 96/13; 96/14; 210/500.23; 210/500.39

(58) Field of Classification Search .......... 95/45, 95/47–55; 96/8, 10, 13, 14; 210/500.23, 210/500.39  
See application file for complete search history.

(56) References Cited

U.S. PATENT DOCUMENTS

| | | | |
|---|---|---|---|
| 4,080,744 A * | 3/1978 | Manos | 34/340 |
| 4,120,098 A * | 10/1978 | Manos | 34/337 |
| RE30,351 E * | 7/1980 | Hoehn et al. | 95/54 |
| 4,378,324 A * | 3/1983 | Makino et al. | 264/41 |
| 4,690,873 A * | 9/1987 | Makino et al. | 96/10 |
| 4,705,540 A * | 11/1987 | Hayes | 95/51 |
| 4,717,393 A * | 1/1988 | Hayes | 95/51 |
| 4,830,640 A * | 5/1989 | Nakamura et al. | 96/10 |
| 4,880,442 A * | 11/1989 | Hayes | 95/51 |
| 4,997,462 A * | 3/1991 | Nakatani et al. | 210/640 |
| 5,015,270 A * | 5/1991 | Ekiner et al. | 95/54 |
| 5,055,116 A | 10/1991 | Kohn et al. | 55/16 |
| 5,061,298 A | 10/1991 | Burgoyne, Jr. et al. | 55/16 |
| 5,076,816 A * | 12/1991 | Avrillon et al. | 95/51 |
| 5,085,676 A * | 2/1992 | Ekiner et al. | 96/13 |
| 5,178,650 A * | 1/1993 | Hayes | 95/47 |
| 5,234,471 A * | 8/1993 | Weinberg | 95/47 |
| 5,248,319 A | 9/1993 | Ekiner et al. | 95/54 |
| 5,264,166 A * | 11/1993 | White et al. | 264/41 |
| 5,266,100 A * | 11/1993 | Simmons | 95/43 |
| 5,286,539 A * | 2/1994 | Kusuki et al. | 96/10 |
| 5,310,415 A * | 5/1994 | Simmons et al. | 95/45 |
| 5,443,728 A | 8/1995 | Macheras et al. | 210/500.23 |
| 5,608,014 A | 3/1997 | Ekiner | 525/432 |
| 5,635,067 A | 6/1997 | Macheras | 210/500.23 |
| 5,647,894 A * | 7/1997 | Ohara et al. | 96/13 |
| 5,674,629 A * | 10/1997 | Avrillon | 428/473.5 |
| 5,749,943 A * | 5/1998 | Shimazu et al. | 95/50 |
| 5,917,137 A * | 6/1999 | Ekiner | 96/10 |
| 5,964,925 A * | 10/1999 | Ozcayir et al. | 96/14 |
| 5,969,087 A * | 10/1999 | Maeda | 528/353 |
| 6,296,684 B1 * | 10/2001 | Ekiner | 95/45 |
| 6,383,258 B1 * | 5/2002 | Simmons | 95/45 |
| 6,425,944 B1 * | 7/2002 | Faure et al. | 96/14 |
| 6,464,755 B1 * | 10/2002 | Nakanishi et al. | 95/52 |
| 6,497,747 B1 * | 12/2002 | Ding et al. | 95/45 |
| 6,602,415 B1 * | 8/2003 | Koros et al. | 210/500.38 |
| 6,709,491 B1 * | 3/2004 | Kawakami et al. | 96/4 |
| 6,755,900 B1 * | 6/2004 | Koros et al. | 96/10 |
| 6,790,263 B1 * | 9/2004 | Ding et al. | 96/13 |
| 2002/0035922 A1 * | 3/2002 | Nakanishi et al. | 95/52 |
| 2003/0126990 A1 * | 7/2003 | Koros et al. | 96/10 |
| 2003/0131731 A1 * | 7/2003 | Koros et al. | 96/10 |
| 2004/0177753 A1 * | 9/2004 | Chung et al. | 95/43 |

FOREIGN PATENT DOCUMENTS

EP 0412882 A1 * 2/1991  
EP 0437611 A1 * 7/1991

OTHER PUBLICATIONS

International Search Report for PCT/IB03/04769.  
Bos A., et al.: "*Suppression of gas separation membrane plasticization by homogeneous polymer blending*", AIChE Journal, New York, US, vol. 47, No. 5, May 2001, pp. 1088-1093.  
Barsema J. N., et al.: "*Preparation and characterization of highly selective dense and hollow fiber asymmetric membranes based on BTDA-TDI/MDI co-polyimide*", Journal of Membrane Science, Elsevier Scientific Publ. Co., Amsterdam, NL, vol. 216, No. 1-2, May 1, 2003, pp. 195-205.

* cited by examiner

Primary Examiner—Robert H. Spitzer  
(74) Attorney, Agent, or Firm—Linda K. Russell

(57) ABSTRACT

The present invention provides a selectively gas permeable membrane that has a superior combination of permeability and selectivity. The membrane composition includes a Type 1 copolyimide uniformly blended with a Type 2 copolyimide, which polymers are defined by chemical structure more specifically in this disclosure. The invention also provides a method of using the membrane of the copolyimide blend to separate components of gas mixtures.

16 Claims, No Drawings

POLYIMIDE BLENDS FOR GAS SEPARATION MEMBRANES

This application claims priority of U.S. provisional patent application No. 60/430,275 filed Dec. 2, 2002.

FIELD OF THE INVENTION

This invention relates to improved membranes for the separation of gases from blends of specific polyimide polymers. Membranes fabricated from these blends exhibit a particularly useful combination of gas-separating properties, especially for the separation of carbon dioxide from hydrocarbons.

BACKGROUND OF THE INVENTION

Permselective membranes for gas separation are known and used commercially in applications such as the production of oxygen-enriched air, production of nitrogen-enriched-air for inerting and blanketing, separation of carbon dioxide from methane or nitrogen for the upgrading of natural gas streams, and the separation of hydrogen from various petrochemical and oil refining streams. The separation of gases by polymeric membranes is thought to depend on the size of the gas molecules and the physical or chemical interaction of the gas with the material of the membrane. For certain gas streams, one or more component or minor contaminant may exhibit a strong interaction with the material of the membrane, which can plasticize the membrane. This can result in reduced production rate and selectivity, and ultimately, loss of membrane performance. A membrane with a good balance of high production rate and selectivity for the gases of interest, and persistently good separation performance despite long-term contact with aggressive stream composition, pressure and temperature conditions is highly desired.

U.S. Pat. No. 4,705,540 discloses highly permeable polyimide gas separation membranes prepared from phenylene diamines having substituents on all positions ortho to the amine functions and a rigid dianhydride or mixtures thereof, specifically pyromellitic dianhydride (PMDA) and 4,4'-(hexafluoroisopropylidene)-bis(phthalic anhydride) (6FDA). These polyimides form membranes with high gas permeabilities but fairly low permselectivities. These polyimides are also sensitive to various organic solvents.

U.S. Pat. No. 4,717,393 shows that polyimides incorporating at least in part 3,3',4,4'-benzophenone tetracarboxylic dianhydride and phenylene diamines having substituents on all positions ortho to the amine functions can be photochemically crosslinked. Membranes formed from such photochemically crosslinked polyimides have improved environmental stability and superior gas selectivity than uncrosslinked polyimide. However, photochemical crosslinking is not a practical method for fabricating gas separation membranes cost-effectively.

U.S. Pat. No. 4,880,442 discloses highly permeable polyimide gas separation membranes prepared from phenylene diamines having substituents on all positions ortho to the amine functions and essentially non-rigid dianhydrides. These polyimides again exhibit high gas permeabilities, but low permselectivities.

Bos et. al., AIChE Journal, 47,1088 (2001), report that polymer blends of Matrimid® 5218 polyimide (3,3',4,4'-benzophenone tetracarboxylic dianhydride and diaminophenylindane) and copolyimide P84 [copolyimide of 3,3',4,4'-benzophenone tetracarboxylic dianhydride and 80% toluenediisocyanate/20% 4,4'-methylene-bis(phenylisocyanate)] can increase the stability of the membrane against carbon dioxide plasticization when compared to the plain Matrimid® 5218 membrane. They do not disclose any other polyimide blends used for gas separation however.

U.S. Pat. No. 5,055,116 describes a blend of aromatic polyimides, in which the proportion of the polymer components is adjusted to achieve certain permeability and selectivity of a polymer membrane. The final properties of a new polymer membrane may be predicted so that a membrane with those desired final properties could then be manufactured. U.S. Pat. No. 5,055,116 indicates that the gas transport properties of the membrane prepared from the polyimide blends are predictable and the membrane may be "engineered" to achieve the desired final properties. To the contrary, the gas transport properties of the present invention are unpredictable and surprisingly good.

U.S. Pat. No. 5,635,067 discloses a fluid separation membrane based on a blend of two distinct polyimides. One is the copolymer derived from the co-condensation of benzophenone 3,3',4,4'-tetracarboxylic acid dianhydride (BTDA) and optionally pyromellitic dianhydride (PMDA) with a mixture of toluene diisocyanate and/or 4,4'-methylene-bis(phenylisocyanate). The other is Matrimid® 5218 polyimide.

The permeation properties of miscible polymer blends can be estimated from the following equation 1 (D. R. Paul and S. Newman, "Polymer Blends", Vol. 1, Chapter 10, p. 460, Academic Press, New York, 1978, B. G. Ranby, J. Polymer Science, Part C 51 p. 89, 1975, A. E. Barnabeo, W. S. Creasy, L. M. Robeson, J. Polymer Science, 13, p. 1979, 1975):

$$\ln \alpha_B \approx \sum_i \varphi_i \ln \alpha_i \tag{1}$$

where:
- $\alpha_B$ is the blend permeability or selectivity,
- $\phi_i$ is the volume fraction of component i, and
- $\alpha_i$ is the permeability or selectivity of each blend component.

For most blends cited by Paul and Newman, measured permeation performance corresponded reasonably well with permeation performance calculated by Equation 1. Therefore significant deviations of actual performance either over or under calculated performance predicted by Equation 1 indicates unusual behavior of the blend.

It is desirable to have polymeric gas separation membranes that exhibit high gas permeation rates while maintaining high relative gas selectivity. However, prior art membrane materials generally compromise one for the other. A major challenge for researchers in this field has been to develop materials that show either an increase in permeability with little sacrifice in selectivity, or an increase in selectivity with little sacrifice in permeability.

SUMMARY OF THE INVENTION

Accordingly, The present invention provides a membrane for gas separation comprising a blend of at least one polymer of a Type 1 copolyimide and at least one polymer of a Type 2 copolyimide in which the Type 1 copolyimide comprises repeating units of formula I

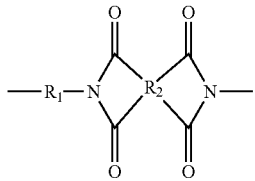

(I)

in which $R_2$ is a moiety having a composition selected from the group consisting of formula A, formula B, formula C and a mixture thereof,

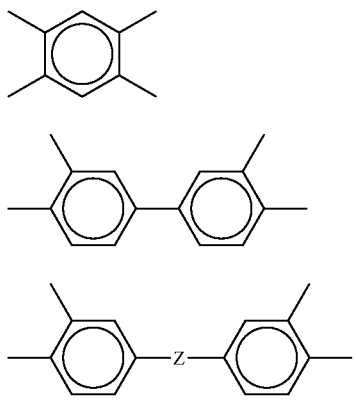

(A)

(B)

(C)

Z is a moiety having a composition selected from the group consisting of formula L, formula M, formula N and a mixture thereof; and

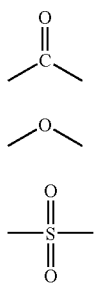

(L)

(M)

(N)

$R_1$ is a moiety having a composition selected from the group consisting of formula Q, formula S, formula T, and a mixture thereof,

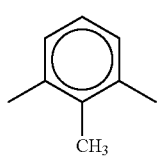

(Q)

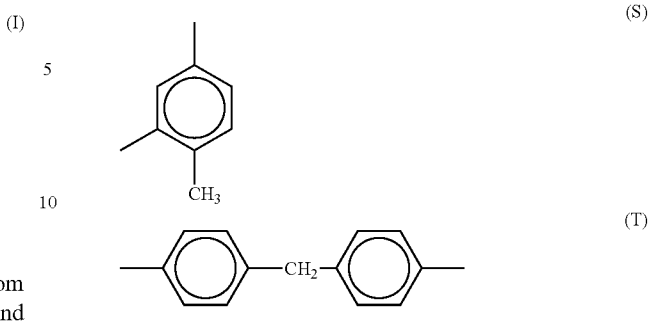

(S)

(T)

in which the Type 2 copolyimide comprises the repeating units of formulas IIa and IIb

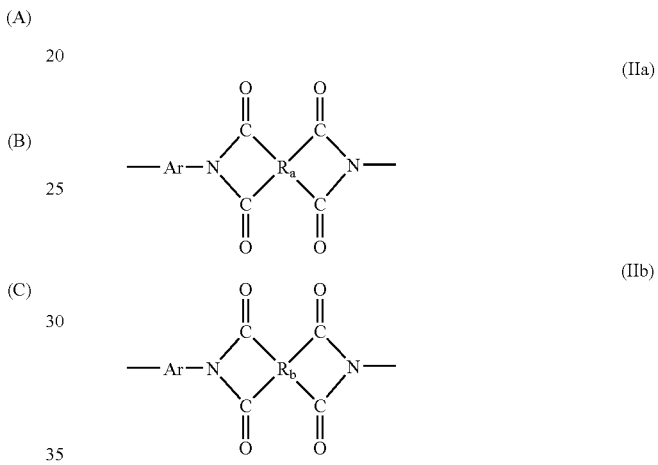

(IIa)

(IIb)

in which Ar is a moiety having a composition selected from the group consisting of formula U, formula V, and a mixture thereof,

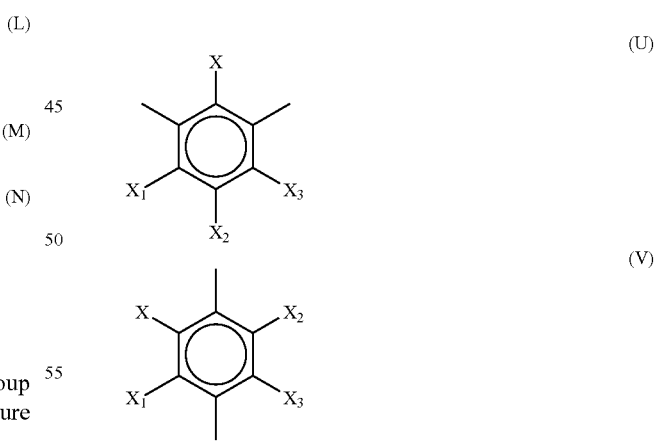

(U)

(V)

in which

X, $X_1$, $X_2$, $X_3$ independently are hydrogen or an alkyl group having 1 to 6 carbon atoms, provided that at least two of X, $X_1$, $X_2$, or $X_3$ on each of U and V are an alkyl group, Ar' is any aromatic moiety, $R_a$ and $R_b$ each independently have composition of formulas A, B, C, D or a mixture thereof, and

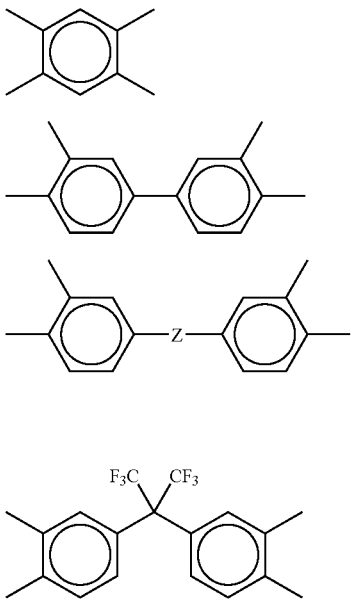

(A)

(B)

(C)

(D)

Z is a moiety having composition selected from the group consisting of formula L, formula M, formula N and a mixture thereof.

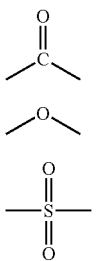

(L)

(M)

(N)

This invention also provides a method of separating one or more gases from a gas mixture comprising
(a) providing a gas separation membrane comprising a blend of at least one polymer of a Type 1 copolyimide and at least one polymer of a Type 2 copolyimide in which the Type 1 and Type 2 copolyimides are as defined above,
(b) contacting the gas mixture with one side of the gas separation membrane thereby causing more preferentially permeable gases of the mixture to permeate the membrane faster than less preferentially permeable gases to form a permeate gas mixture enriched in the more preferentially permeable gases on the opposite side of the membrane and a retentate gas mixture depleted in the more preferentially permeable gases on the one side of the membrane, and
(c) withdrawing the permeate gas mixture and the retentate gas mixture separately from the membrane.

DETAILED DESCRIPTION OF THE INVENTION

The membranes that exhibit an excellent combination of high permselectivity and permeability for the separation of gases according to the present invention are prepared from blends of selected polyimide copolymers. That is, the blends comprise a Type 1 copolyimide and a Type 2 copolyimide, as are defined more particularly herein. Preferably, the material of the membrane consists essentially of the blend of these copolyimides. Provided that they do not significantly adversely affect the separation performance of the membrane, other components can be present in the blend such as, processing aids, chemical and thermal stabilizers and the like.

The Type 1 copolyimide comprises repeating units of formula I

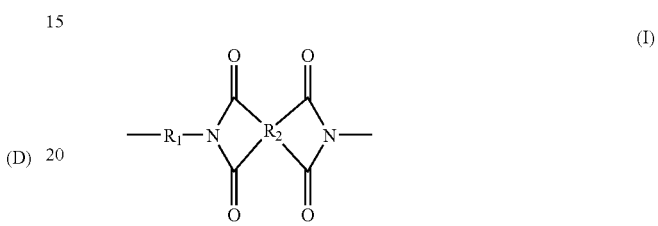

(I)

in which $R_2$ is a moiety having composition selected from the group consisting of formula A, formula B, formula C and a mixture thereof,

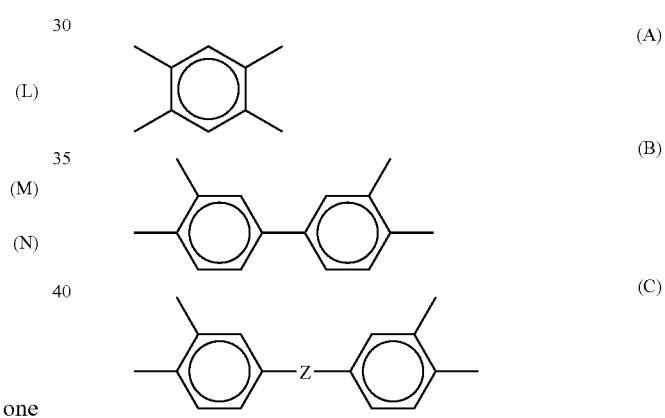

(A)

(B)

(C)

Z is a moiety having a composition selected from the group consisting of formula L, formula M, formula N and a mixture thereof; and

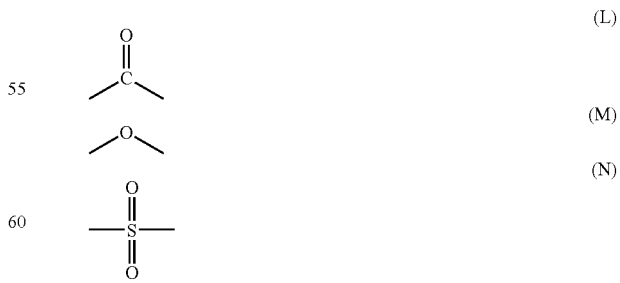

(L)

(M)

(N)

$R_1$ is a moiety having a composition selected from the group consisting of formula Q, formula S, formula T, and a mixture thereof.

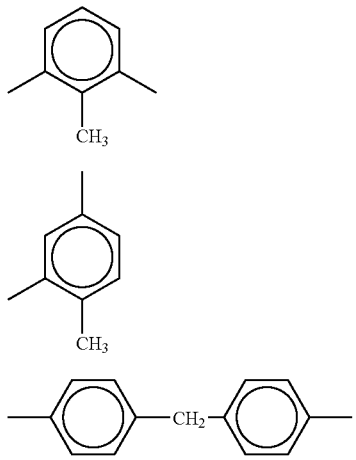

(Q)

(S)

(T)

In a preferred embodiment, the repeating units of the Type 1 copolyimide have the composition of formula Ia.

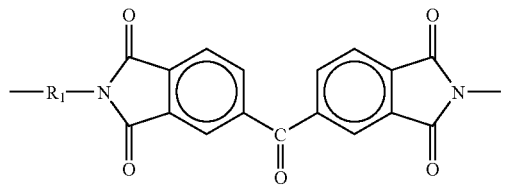

(Ia)

A preferred polymer of this composition in which it is understood that $R_1$ is formula Q in about 16% of the repeating units, formula S in about 64% of the repeating units and formula T in about 20% of the repeating units is available from HP Polymer GmbH under the tradename P84. P84 is believed to be derived from the condensation reaction of benzophenone tetracarboxylic dianhydride (BTDA, 100 mole %) with a mixture of 2,4-toluene diisocyanate (2,4-TDI, 64 mole %), 2,6-toluene diisocyanate (2,6-TDI, 16 mole %) and 4,4'-methylene-bis(phenylisocyanate) (MDI, 20 mole %).

In another preferred embodiment, the Type 1 copolyimide comprises repeating units of formula Ib.

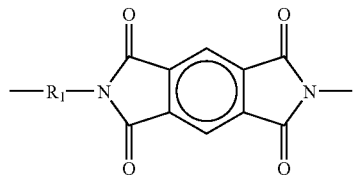

(Ib)

Preference is given to using the Type 1 copolyimide of formula Ib in which $R_1$ is a composition of formula Q in about 1–99% of the repeating units, and of formula S in a complementary amount totaling 100% of the repeating units.

In yet another preferred embodiment, the Type 1 copolyimide is a copolymer comprising repeating units of both formula Ia and Ib in which units of formula Ib constitute about 1–99% of the total repeating units of formulas Ia and Ib. A polymer of this structure is available from HP Polymer GmbH under the tradename P84-HT325. P84-HT325 is believed to have repeating units according to formulas Ia and Ib in which the moiety $R_1$ is a composition of formula Q in about 20% of the repeating units and of formula S in about 80% of the repeating units, and in which repeating units of formula Ib constitute about 40% of the total repeating units of formulas Ia and Ib. P84-HT325 is believed to be derived from the condensation reaction of benzophenone tetracarboxylic dianhydride (BTDA, 60 mole %) and pyromellitic dianhydride (PMDA, 40 mole %) with 2,4-toluene diisocyanate (2,4-TDI, 80 mole %) and 2,6-toluene diisocyanate (2,6-TDI, 20 mole %).

The Type 2 polyimide comprises repeating units having composition of formulas IIa and IIb:

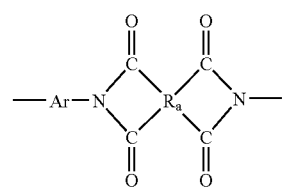

(IIa)

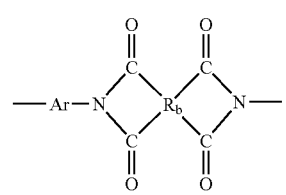

(IIb)

in which Ar is a moiety having a composition selected from the group consisting of formula U, formula V, and a mixture thereof,

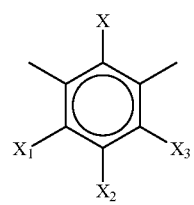

(U)

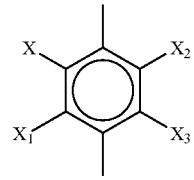

(V)

in which

X, $X_1$, $X_2$, $X_3$ independently are hydrogen or alkyl groups having 1 to 6 carbon atoms, provided that at least two of X, $X_1$, $X_2$, or $X_3$ on each of U and V are an alkyl group, Ar' is any aromatic moiety, $R_a$ and $R_b$ each independently have composition of formulas A, B, C, D or a mixture thereof, and

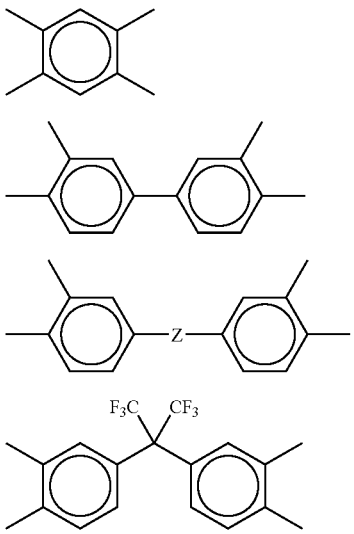

Z is a moiety having composition selected from the group consisting of formula L, formula M, formula N and a mixture thereof

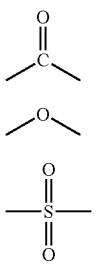

In the Type 2 polyimide, the repeating unit of formula IIa should be at least about 25%, and preferably at least about 50% of the total repeating units of formula IIa and formula IIb. Ar' can be the same as or different from Ar.

The polyimides of this invention should have a weight average molecular weight within the range of about 23,000 to about 400,000 and preferably about 50,000 to about 280,000.

The blend of Type 1 and Type II copolyimides should be uniform and can be formed from the component copolyimides in conventional ways. For example, the Type 1 and Type 2 copolyimides can be synthesized separately and melt compounded or mixed in solution by dissolving each copolyimide in one or more suitable solvents. If the blend is solvent mixed, the solution can be stored or used directly in subsequent membrane fabrication steps or the solvent can be removed to provide a solid blend for later use. If the blend is prepared by melt compounding, the resulting blend can be dissolved in a suitable solvent for subsequent membrane fabrication. Uniformity of the dry (i.e., solvent-free) blend either before or after membrane formation can be checked by detecting only a single compositional dependent glass transition temperature lying between the glass transition temperatures of the constituent components. Differential scanning calorimetry and dynamic mechanical analysis can be used to measure glass transition temperature.

Preferably, the blend is formed by dissolving the Type 1 and Type 2 copolyimides in separate solutions, combining the solutions and agitating the combined solutions to obtain a dissolved blend. Mild heating to temperatures in the range of about 50 to 100° C. can optionally be used to accelerate dissolution of the components. The polyimide blend is sufficiently soluble in solvents typically used for processing into suitable gas separation membranes. The ratio of Type 1 copolyimide to Type 2 copolyimide in the blend is preferably greater than about 0.2, and more preferably at least about 1.0.

The polyimides described herein are made by methods well known in the art. Type 1 polyimides can conveniently be made by polycondensation of an appropriate diisocyanate with approximately an equimolar amount of an appropriate dianhydride. Alternatively, Type 1 polyimides can be made by polycondensation of equimolar amounts of a dianhydride and a diamine to form a polyamic acid followed by chemical or thermal dehydration to form the polyimide. The diisocyanates, diamines and dianhydrides useful for making the Type 1 copolyimides of interest are usually available commercially. Type 2 polyimides are typically prepared by the dianhydride/diamine reaction process just mentioned because the diamines are more readily available than the corresponding diisocyanates.

The preferred Type 1 and Type 2 polyimides are soluble in a wide range of common organic solvents including most amide solvents, that are typically used for the formation of polymeric membranes, such as N-methylpyrrolidone ("NMP") and m-cresol. This is a great advantage for the ease of fabrication of industrially useful gas separation membranes.

To be economically practical, the separation membrane usually comprises a very thin selective layer that forms part of a thicker structure. This may be, for example, an integral asymmetric membrane, comprising a dense skin region that forms the selective layer and a micro-porous support region. Such membranes are described, for example, in U.S. Pat. No. 5,015,270 to Ekiner. As a further, and preferred, alternative, the membrane may be a composite membrane, that is, a membrane having multiple layers. Composite membranes typically comprise a porous but non-selective support membrane, which provides mechanical strength, coated with a thin selective layer of another material that is primarily responsible for the separation properties. Typically, such a composite membrane is made by solution-casting (or spinning in the case of hollow fibers) the support membrane, then solution-coating the selective layer in a separate step. Alternatively, hollow-fiber composite membranes can be made by co-extrusion spinning of both the support material and the separating layer simultaneously as described in U.S. Pat. No. 5,085,676 to Ekiner. The polyimide blends are utilized in the selectively permeable layer of the membrane according to the present invention. The support layer of a composite membrane can be free of the copolyimide blend.

The membranes of the invention can be fabricated into any membrane form by any appropriate conventional methods. For illustrative purposes, a method to prepare membranes in accordance with this invention is generally described as follows. Type 1 and Type 2 copolyimide compositions are selected and are combined in dry particulate form in a dry mix of desired proportion, e.g., 65% Type 1 and 35% Type 2. The solid polymer powder or flake is dissolved in a suitable solvent such as N-methylpyrrolidone at approximately 20–30% polymer content. The polymer blend solution is cast as a sheet at the desired thickness onto a flat support layer (for flat sheet membranes), or extruded through a conventional hollow fiber spinneret (for hollow fiber membranes). If a uniformly dense membrane is desired, the solvent is slowly removed by heating or other means of evaporation. If an asymmetric membrane is desired, the film or fiber structure is quenched in a liquid that is a non-solvent for the polymer and that is miscible with the solvent for the polyimide. Alternatively, if a composite membrane is desired, the polymer is cast or extruded over a porous support of another material in either flat film or hollow fiber form. The separating layer of the composite membrane can be a dense ultra-thin or asymmetric film.

The resulting membranes may be mounted in any convenient type of housing or vessel adapted to provide a supply of the feed gas, and removal of the permeate and residue gas. The vessel also provides a high-pressure side (for the feed gas and residue gas) and a low-pressure side of the membrane (for the permeate gas). For example, flat-sheet membranes can be stacked in plate-and-frame modules or wound in spiral-wound modules. Hollow-fiber membranes are typically potted with a thermoset resin in cylindrical housings. The final membrane separation unit comprises one or more membrane modules, which may be housed individually in pressure vessels or multiple elements may be mounted together in a sealed housing of appropriate diameter and length.

The gas permeation rate (flux) usually varies inversely with selectivity in membrane separations of preferentially permeable gases from other gases in a multi-component gas mixture within many classes of separation membrane materials. This relationship is generally true for all glassy or crystalline, high glass transition temperature polymers, such as polyimides, polyesters, or polyamides. That is, conventional gas separation membranes tend to exhibit either high gas flux with low gas selectivity or high selectivity at low gas flux.

Type 1 and Type 2 copolyimides have characteristics that limit their utility for use in gas separation membranes. Type 1 copolyimides have generally low gas permeability although they exhibit good selectivity. Type 2 copolyimides provide generally low selectivity with high permeability. One of skill in the gas separation membrane art understands that the selectivity of a blend of selectively permeable polymers should be close to the value predicted by equation 1, above. Contrary to expectation, it has been discovered that blends of a Type 1 polymer and a Type 2 polymer provide significantly greater permeability than the Type 1 polymer alone. This occurs without a significant reduction in selectivity. Blend theory predicts that the low selectivity of Type 2 copolyimide should depress the selectivity of the blend to a greater extent than has been found to be the case. Therefore, the blend of Type 1 and Type 2 copolyimides exhibits a serendipitous synergistic effect to provide a superior balance of flux and selectivity for important industrial gas separations.

Moreover, it is well known in the art that many chemically different polyimides are mutually incompatible and do not form homogeneous blends. Fortuitously and in contrast to conventional wisdom, the polymer blends of this invention are miscible in the compositional ranges of interest. This conclusion is based upon evidence of a single glass transition temperature, perfectly clear polymer solutions, and perfectly clear dense polymer films of the blends. A further benefit derived from blending the Type 1 and Type 2 copolyimides according to this invention is that hollow fiber gas separation membranes formed from the blend exhibit improved mechanical properties relative to exclusively Type 1 copolyimide composition fibers.

Membranes from blends of these polyimides enable an attractive combination of carbon dioxide permeability and permselectivity for carbon dioxide over methane, nitrogen, and the like. The membranes exhibit little or no plasticization by carbon dioxide or aliphatic hydrocarbons, and are thus especially useful for the removal of carbon dioxide from industrially significant gas streams, such as in natural gas sweetening. Even at high operating pressure, membranes prepared from such polyimide blends possess an excellent balance of gas permeation rates and selectivity of one gas over other gases in the multi-component gas mixture.

EXAMPLES

This invention is now illustrated by examples of certain representative, non-limiting embodiments thereof, wherein all parts, proportions and percentages are by weight unless otherwise indicated. All units of weight and measure not originally obtained in SI units have been converted to SI units.

Polyimide Supply and Synthesis

P84 and P84-HT325 polyimides (Type 1) were obtained from HP-Polymer GmbH in both the flake and powder forms.

To synthesize Type 2 copolyimides, a 250 mL 3-necked round-bottomed flask, equipped with a mechanical stirrer, a nitrogen inlet, and a Dean-Stark trap was flame dried under a nitrogen atmosphere and allowed to cool to ambient temperature. The aromatic diamine reactant was dissolved in a polar solvent NMP or N,N'-dimethylacetamide (DMAC). The dianhydride reactant was added portion wise to the reaction vessel, which was stirred rapidly. The ratio of diamine to dianhydride was 1:1 to ensure the highest molecular weight. More NMP was added to the reaction vessel to achieve total solids concentration of about 15–20%. The reaction mixture was stirred at room temperature for 2 hours under a nitrogen atmosphere. Liquid o-dichlorobenzene (ODCB) or toluene was then added and the solution was heated and held at 150–180° C. for 5–25 hours to achieve azeoptropic removal of the water. The polymer was then precipitated into water or methanol, ground up in a blender, washed three times with methanol and then twice with water. The polymer was air dried in a vacuum oven at 150–220° C. for at least 2 hours.

Film Preparation

A 20% solution of the polyimide in either NMP or m-cresol was cast onto a glass plate at 100–120° C. using a $38 \times 10^{-5}$ m (15 mil) knife gap. The film was dried on the plate at this temperature for 1–2 hours, removed from the plate, cooled to room temperature and air-dried overnight. The film was further dried in a vacuum oven at about 68 kPa (20 inches Hg) at 220° C. for 3 days under a nitrogen atmosphere. A final film thickness of between $2 \times 10^{-5}$ and $5 \times 10^{-5}$ m (1–2 mils) was thus obtained.

Dense Film Testing

To measure the gas-separation performance of the polymer films a sample disk was cut from the polymer film and tested in a 47 mm ultrafiltration permeation cell (Millipore) modified for gas permeation measurement, with 2.1 MPa (300 psig) mixed-gas 20:80 $CO_2/CH_4$ feed, 6–10 mmHg permeate pressure and 35° C. temperature. The feed flowrate was set high enough to ensure very low conversion of the feed into permeate in the range of about 2–10 cm$^3$ (standard temperature and pressure "STP")/min. Sufficient time was allowed to ensure steady-state permeation. The composition of the feed and permeate streams was measured by gas chromatography with a thermal conductivity detector. The permeate composition was 85–95% $CO_2$. The flowrate through the membrane was derived from the rate of increase of the permeate pressure with a Baratron pressure sensor. The permeabilities of $CO_2$ and $CH_4$ were calculated from the flowrate measurement normalized by the partial pressure difference across the membrane and by the area and thickness of the film sample, and expressed in Barrers. A Barrer is a unit of gas permeability defined as $10^{-10}$ $cm^3$ (STP)·cm/ (sec·cm$^3$·cmHg). Selectivity was calculated as the ratio of the pure component permeabilities.

Comparative Example 1

A dense film of P84 polymer was cast from a solution of 20% P84 and 80% NMP. The film preparation technique above was modified in that the film was dried at 200° C. in a vacuum oven for four days. The thickness of the dry film was 0.075 mm.

Two sample disks were cut from the film and tested by the above-described procedure modified in that the feed flowrate was set at approximately 5 $cm^3$ (STP)/min to ensure very low conversion of the feed into permeate. The test was run for 20 hours before measurement, to ensure steady-state permeation. The permeate composition was 92.1% $CO_2$. The average $CO_2$ permeability of the two film samples was 2.3 Barrers. The average $CO_2/CH_4$ selectivity was 47.1.

Comparative Examples 2–8

Dense Film Samples

The procedure of Comparative Example 1 was repeated except that different polymers were substituted for P84. The polymers used, the average $CO_2$ permeability of two film samples and the average $CO_2/CH_4$ selectivity for each example are shown in Table 1.

Examples 1–12

Dense Film Samples

Dense films of various Type 1/Type 2 polymer blends were cast from solutions comprising 20% total polymer and 80% NMP using the film preparation technique above. The technique was modified in that the film was dried at 200° C. in a vacuum oven for four days. The thickness of the dry film was 0.100 mm. Four sample disks were cut from the film and tested by the method in Comparative Example 1 with 2.1 MPa (300 psig) mixed-gas 20:80 $CO_2/CH_4$ feed, 6–8 mmHg permeate pressure and 35° C. temperature. The average $CO_2$ permeability and $CO_2/CH_4$ selectivity for each sample is reported in Table 1.

For each of the membranes formed from polymer blends, i.e., Exs. 1–12, the selectivity of the membrane for carbon dioxide relative to methane was calculated by equation 1, above. The actual selectivity obtained by measurement was divided by the calculated value and these ratios are also presented in Table 1.

Examples 1–12 demonstrate that membranes of Type 1/Type 2 polymer blends exhibit an unexpectedly favorable combination of permeability and selectivity in comparison to membranes of either Type 1 polymers or Type 2 polymers alone. The permeabilities and selectivities of the Type 1/Type 2 polymer blend membranes are largely within ranges of the corresponding Type 1 and Type 2 composition membranes. However, selectivities provided by the Type 1 polymers (Comp. Exs. 1 and 2) are surprisingly only slightly diminished by adding lower-selectivity Type 2 polymers while the permeabilities of the blend composition membranes are close to the values calculated by equation 1. Example 9 is a slight exception but the membrane composition includes a very large amount of the Type 2 copolyimide.

In every example, the permeability of the Type 1/Type 2 polymer blend membrane was significantly higher than that of the Type 1 composition membrane. All of the operative example selectivities were higher than predicted by equation 1, above. The deviation from theoretical selectivity was usually at least 15%, and in Exs. 3 and 12 as much as about 50% greater than predicted. Although some of the examples the selectivity of the Type 1/Type 2 blend membrane was between the selectivity of the Type 1 and Type 2 compositions, in a significant number of cases, the selectivity of the blend composition membrane was about as high or higher than the selectivity of membranes formed from Type 1 or Type 2 polymer alone. See Exs. 2, 3, 5, 11 and 12. Thus the combination of Type 1 and Type 2 copolyimides have a synergistic effect on gas permeation selectivity in membrane separations. This synergy provides a beneficial combination of selectivity and permeability of such magnitude that membranes of blends of Type 1 and Type 2 polymers are commercially useful while membranes of either Type 1 polymer or Type 2 polymer remain commercially unattractive.

TABLE 1

| Example | Type 1 Polymer | Type 2 Polymer | Type 1:Type 2 Polymer Ratio | Permeability $P_{CO2}$ (Barrers) | Selectivity $\alpha = P_{CO2}/P_{CH4}$ | Selectivity Ratio $\alpha_{Measured} \div \alpha_{Calculated}$ |
|---|---|---|---|---|---|---|
| Comp. Ex. 1 | P84 | — | 1:0 | 2.3 | 47.1 | |
| Comp. Ex. 2 | P84 HT325 | — | 1:0 | 6.7 | 48.8 | |
| Comp. Ex. 3 | — | A | 0:1 | 310 | 23 | |
| Comp. Ex. 4 | | B | 0:1 | 65 | 40.3 | |
| Comp. Ex. 5 | — | C | 0:1 | 39 | 43.2 | |
| Comp. Ex. 6 | — | D | 0:1 | 746 | 22.1 | |
| Comp. Ex. 7 | — | E | 0:1 | 455 | 24.8 | |
| Comp. Ex. 8 | P84 + P84HT325 | | 1:1 | 3.3 | 43 | 0.90 |
| Ex. 1 | P84 | A | 1:1 | 30 | 39.7 | 1.21 |
| Ex. 2 | P84 | A | 3:1 | 6.2 | 48 | 1.22 |
| Ex. 3 | P84 | D | 4:1 | 3.6 | 63 | 1.56 |
| Ex. 4 | P84 | E | 3:1 | 8 | 43 | 1.07 |

TABLE 1-continued

| Example | Type 1 Polymer | Type 2 Polymer | Type 1:Type 2 Polymer Ratio | Permeability $P_{CO2}$ (Barrers) | Selectivity $\alpha = P_{CO2}/P_{CH4}$ | Selectivity Ratio $\alpha_{Measured} \div \alpha_{Calculated}$ |
|---|---|---|---|---|---|---|
| Ex. 5 | P84HT325 | A | 4:1 | 11.7 | 48.6 | 1.16 |
| Ex. 6 | P84HT325 | A | 3:1 | 11.6 | 43.2 | 1.07 |
| Ex. 7 | P84HT325 | A | 2:1 | 15.8 | 44.9 | 1.18 |
| Ex. 8 | P84HT325 | A | 1:1 | 27.1 | 39.4 | 1.18 |
| Ex. 9 | P84HT325 | A | 1:3 | 115 | 32 | 1.15 |
| Ex. 10 | P84HT325 | B | 1:1 | 29 | 45.6 | 1.03 |
| Ex. 11 | P84HT325 | C | 3:1 | 9 | 54.3 | 1.15 |
| Ex. 12 | P84HT325 | D | 1:1 | 10.5 | 48 | 1.46 |

TABLE 2

| Code | Composition |
|---|---|
| Materials | |
| A | DAM + PMDA/BPDA (1:1) |
| B | TSN + 6FDA/BPDA (1:1) |
| C | DAM/TSN (1:1) + DSDA |
| D | DAM + PMDA/BTDA (3:1) |
| E | DAM + PMDA/BTDA (6:1) |
| Abbreviations | |
| DAM | 2,4-diaminomesitylene |
| TSN | 3,7-diamino-2,8-dimethyldiphenylsulfone or o-tolidine sulfone |
| PMDA | pyromellitic dianhydride |
| DSDA | 3,3',4,4'-diphenylsulfone tetracarboxylic dianhydride |
| BPDA | 3,3',4,4'-biphenyl tetracarboxylic dianhydride |
| 6FDA | 4,4'-(2,2,2-trifluoro-1-(trifluoromethyl)ethylidine)bis(1,2-benzene dicarboxylic acid dianhydride) |

Comparative Example 9

Hollow Fiber of P84:P84HT325

A spin dope formulation containing 32% P84/P84HT325 polymer blend (1:1 wt ratio), 9.6% tetramethylenesulfone (TMS) and 1.6% acetic anhydride in NMP was prepared. The dope was extruded at 85 C at flowrate of 180 cm³/hour through a spinneret with fiber channel dimensions of outer diameter 559 microns and inner diameter 254 microns. A solution containing 85% NMP in water was injected at a rate of 33 cm³/hour through the spinneret to form the bore of the fiber. The nascent fiber traveled through an air gap length of 2.5 cm at room temperature into a water coagulant bath at 8 C and was wound up at a rate of 50 m/min. The water-wet fiber was rinsed with running water at 50 C for about 12 hours and then sequentially exchanged with methanol and hexane as taught in U.S. Pat. No. 4,080,744 and U.S. Pat. No. 4,120,098. Then the fiber was dried at 100° C. in a vacuum oven for one hour.

The untreated fibers were tested for permeation of pure $CO_2$ and $CH_4$ gases separately in a hollow fiber gas separation module. The procedure was similar to that for the dense films, above except that the feed gas on the shell side was maintained at 0.35 MPa (50 psig) at 23 C. The $CO_2$ permeance was 110 gas permeation units (GPU) and the $CO_2/CH_4$ selectivity was 25.

The fibers were treated to seal defects in the dense separating layer by contacting the outer surfaces of the fibers for 30 min. with a 2% weight solution of Sylgard® 184 (Dow Corning Corp) in isooctane. The fibers were dried in a vacuum oven at 100 C. The treated fibers were tested as above and found to have $CO_2$ permeance of 36 GPU and $CO_2/CH_4$ selectivity of 55. These same treated fibers were also tested with a 10:90 ratio mixture of $CO_2$ and $CH_4$ feed at 35 C and 2.1 MPa (300 psig). Separation performance was $CO_2$ permeance of 14 GPU and $CO_2/CH_4$ selectivity of 45. This selectivity agrees well with the intrinsic selectivity of 43 of the P84:P84HT325 (1:1) blend dense film as reported in Comparative Example 8 above.

Example 13

Hollow Fiber of P84:Polymer D (4:1) Blend

A spin dope formulation containing 32% P-84:Polymer D blend in 4:1 ratio, 9.6% TMS and 1.6% acetic anhydride in NMP was prepared. The dope was extruded at 92 C at flow rate of 180 cm³/hour through a spinneret with fiber channel dimensions of outer diameter 559 microns and inner diameter 254 microns. A solution containing 82.5% weight NMP in water was injected through the spinneret to form the bore of the fiber at a flow rate of 33 cm³/hour. The nascent fiber traveled through an air gap length of 5 cm at room temperature into a water coagulant bath at 7 C and was wound up at a rate of 50 m/min. The fibers were washed, solvent exchanged with methanol and hexane, and dried as in Comparative Example 9. They were tested with a 10:90 ratio $CO_2/CH_4$ gas mixture feed at 35 C and 2.1 MPa (300 psig) for $CO_2$ and $CH_4$ permeation. Separation properties of the untreated fibers were $CO_2$ permeance of 99 GPU and $CO_2/CH_4$ selectivity of 29. The fibers were treated as in Comparative Example 9 to seal defects and were determined to have $CO_2$ permeance of 62 GP and $CO_2/CH_4$ selectivity of 44 after post treatment.

Example 14

Hollow Fiber of P84:Polymer E (3:1) Blend

A spin dope formulation was spun into hollow fibers as in Ex. 13 except that the 32% polymer in the dope was 3:1 ratio of P-84: Polymer E blend. Also the nascent fiber traveled through an air gap length of 2.5 cm at room temperature into a water coagulant bath at 8 C and were washed, solvent exchanged with methanol and hexane, and dried as in Comparative Example 9. As tested with 10:90 ratio mixed gas feed of $CO_2/CH_4$ at 35 C and 2.1 MPa (300 psig) the untreated fiber permeation properties were $CO_2$ permeance of 89 GPU and $CO_2/CH_4$ selectivity of 25. After treatment to seal defects as in Comparative Example 9 the fibers were determined to have $CO_2$ permeance of 58 GPU and $CO_2$/$CH_4$ selectivity of 46 after post treatment.

Example 15

Hollow Fiber of P84:Polymer A (3:1) Blend

The procedure of Ex. 13 was repeated except that the spin dope formulation contained 31% P-84: Polymer A (3:1) polymer blend, 9.3% TMS and 1.55% acetic anhydride in NMP, fiber extrusion rate was 200 cm³/hour, spinneret fiber channel dimensions were outer diameter 838 microns and inner diameter 406 microns, spinning temperature was 84 C and the nascent fiber traveled through an air gap length of 1 cm. The fibers were washed, solvent exchanged with methanol and hexane, and dried as in Comparative Example 9. The untreated fibers were tested as in Ex. 13 and found to have $CO_2$ permeance of 124 GPU and $CO_2/CH_4$ selectivity of 35. After post treatment as in Comparative Ex. 9 $CO_2$ permeance GPU and $CO_2/CH_4$ selectivity were 41 and 33, respectively.

Although specific forms of the invention have been selected for illustration and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A method of separating one or more gases from a gas mixture comprising:
   (a) providing a gas separation membrane comprising a blend of at least one polymer of a Type 1 copolyimide and at least one polymer of a Type 2 copolyimide, in which the Type 1 copolyimide comprises repeating units of formula I $$—R_1—N\underset{\underset{O}{\|}}{\overset{\overset{O}{\|}}{C}}\underset{\underset{O}{\|}}{\overset{\overset{O}{\|}}{R_2}}\underset{\underset{O}{\|}}{\overset{\overset{O}{\|}}{C}}N— \quad (I)$$

in which $R_2$ is a moiety having a composition selected from the group consisting of formula A, formula B, formula C, and a mixture thereof, (A) [tetramethylbenzene structure]

(B) [dimethyl biphenyl structure]

(C) [dimethylphenyl-Z-dimethylphenyl structure]

Z is a moiety having a composition selected from the group consisting of formula L, formula M, formula N, and a mixture thereof; and (L) carbonyl group $—C(=O)—$ (M) ether $—O—$ (N) sulfonyl $—S(=O)_2—$ $R_1$ is a moiety having a composition selected from the group consisting of formula Q, formula S, formula T, and a mixture thereof, (Q) [methylbenzene with CH3]

(S) [dimethylbenzene with two CH3]

(T) [diphenylmethane structure with CH2]

in which the Type 2 copolyimide comprises the repeating units of formulas IIa and IIb, $$—Ar—N\underset{\underset{O}{\|}}{\overset{\overset{O}{\|}}{C}}\underset{\underset{O}{\|}}{\overset{\overset{O}{\|}}{R_a}}\underset{\underset{O}{\|}}{\overset{\overset{O}{\|}}{C}}N— \quad (IIa)$$

-continued

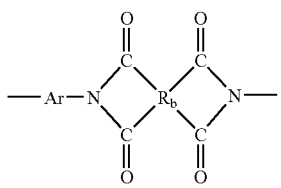
(IIb)

in which Ar is a moiety having a composition selected from the group consisting of formula U, formula V, and a mixture thereof, and

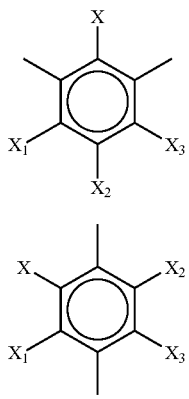
(U)

(V)

in which X, $X_1$, $X_2$, $X_3$ independently are hydrogen or an alkyl group having 1 to 6 carbon atoms, provided that at least two of X, $X_1$, $X_2$, or $X_3$ on each of U and V are an alkyl group, Ar' is any aromatic moiety, $R_a$ and $R_b$, each independently have composition of formulas A, B, C, D or a mixture thereof, and

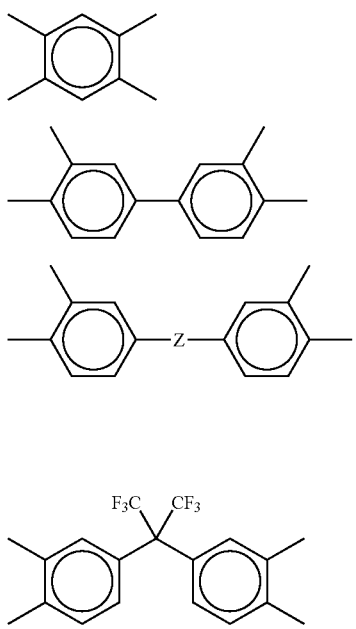
(A)

(B)

(C)

(D)

Z is a moiety having composition selected from the group consisting of formula L, formula M, formula N, and a mixture thereof;

(L)

(M)

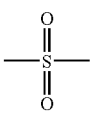
(N)

(b) contacting the gas mixture with one side of the gas separation membrane, thereby causing more preferentially permeable gases of the mixture to permeate the membrane faster than less preferentially permeable gases to form a permeate gas mixture enriched in the more preferentially permeable gases on the opposite side of the membrane, and a retentate gas mixture depleted in the more preferentially permeable gases on the one side of the membrane; and (c) withdrawing the permeate gas mixture and the retentate gas mixture separately from the membrane.

2. The method of claim 1, in which the gas mixture comprises carbon dioxide and methane.

3. A membrane for gas separation comprising a blend of at least one polymer of a Type 1 copolyimide and at least one polymer of a Type 2 copolyimide in which the Type 1 copolyimide comprises repeating units of formula I

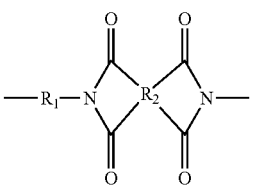
(I)

in which $R_2$ is a moiety having a composition selected from the group consisting of formula A, formula B, formula C and a mixture thereof,

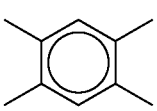
(A)

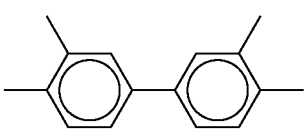
(B)

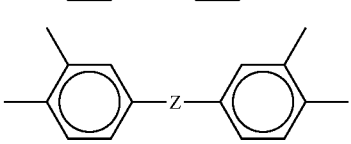
(C)

Z is a moiety having a composition selected from the group consisting of formula L, formula M, formula N and a mixture thereof; and (L)

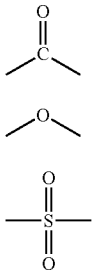

(M)

(N)

$R_1$ is a moiety having a composition selected from the group consisting of formula Q, formula S, formula T, and a mixture thereof, (Q)

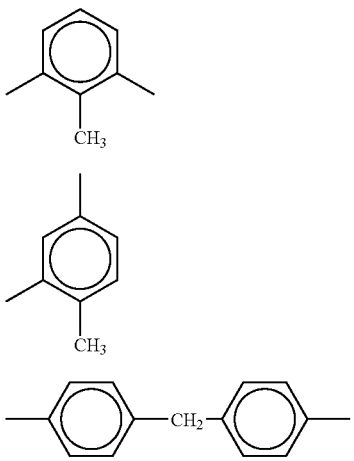

(S)

(T)

in which the Type 2 copolyimide comprises the repeating units of formulas IIa and IIb (IIa)

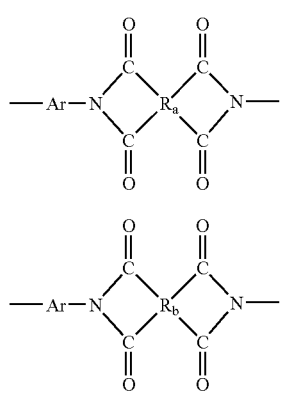

(IIb)

in which Ar is a moiety having a composition selected from the group consisting of formula U, formula V, and a mixture thereof, and (U)

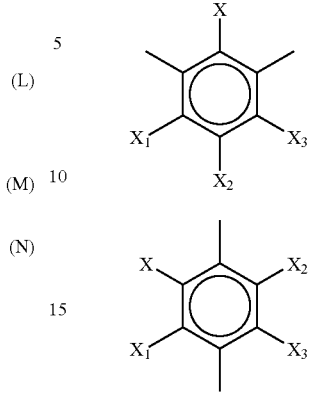

(V)

in which X, $X_1$, $X_2$, $X_3$ independently are hydrogen or an alkyl group having 1 to 6 carbon atoms, provided that at least two of $X_1$, $X_2$, or $X_3$ on each of U and V are an alkyl group, Ar' is any aromatic moiety, $R_a$ and $R_b$ each independently have composition of formulas A, B, C, D or a mixture thereof, and (A)

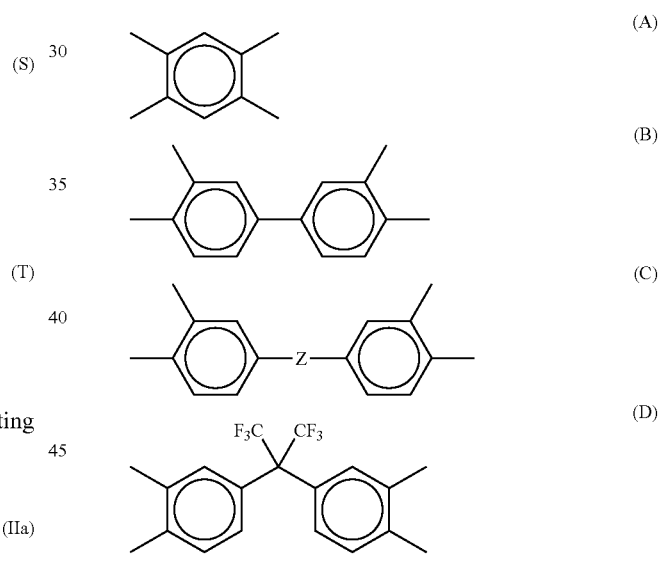

(B)

(C)

(D)

Z is a moiety having composition selected from the group consisting of formula L, formula M, formula N and a mixture thereof (L)

(M)

(N)

4. The membrane of claim 3, in which the Type 1 copolyimide comprises repeating units of formula Ia.

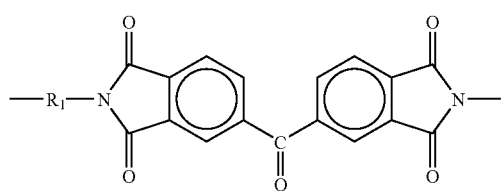
(Ia)

5. The membrane of claim 4, in which $R_1$ is formula Q in about 16% of the repeating units, formula S in about 64% of the repeating units and formula T in about 20% of the repeating units.

6. The membrane of claim 3, in which the Type 1 copolyimide comprises repeating units of formula Ib

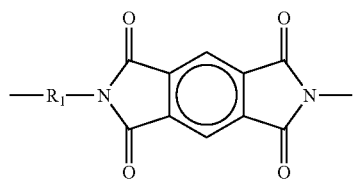
(Ib)

7. The membrane of claim 6, in which $R_1$ is a composition of formula $_Q$ in about 1–99% of the repeating units, and of formula $_S$ in a complementary amount totaling 100% of the repeating units.

8. The membrane of claim 3, in which the Type 1 copolyimide comprises repeating units having composition of formula Ia and repeating units having composition of formula Ib

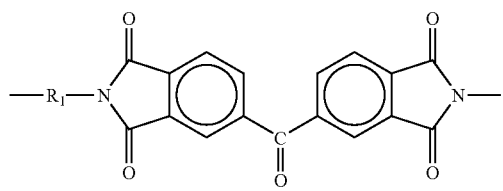
(Ia)

-continued

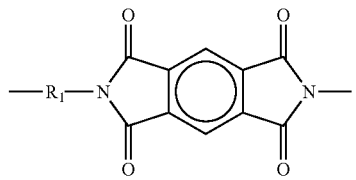
(Ib)

in which units of formula Ib constitute about 1–99% of the total repeating units of formulas Ia and Ib, and in which $R_1$ is a composition of formula $_Q$ in about 1–99% of the repeating units, and of formula $_S$ in a complementary amount totaling 100% of the repeating units.

9. The membrane of claim 8, in which the moiety $R_1$ has a composition of formula Q in about 20% of the repeating units, and of formula $_S$ in about 80% of the repeating units, and in which repeating units of formula Ib are about 40% of the total of repeating units of formulas Ia and Ib.

10. The membrane of claim 3, in which the ratio of Type 1 copolyimide to Type 2 copolyimide is greater than about 0.2.

11. The membrane of claim 10, in which the ratio of Type 1 copolyimide to Type 2 copolyimide is greater than about 1.0.

12. The membrane of claim 3, in which repeating units of formula IIa are at least about 25% of the total repeating units of formula IIa and IIb.

13. The membrane of claim 12, in which repeating units of formula IIa are at least about 50% of the total repeating units of formula IIa and IIb.

14. The membrane of claim 3, in which the Type 2 copolyimide is formed by polycondensation of an aromatic amine selected from the group consisting of 2,4-diaminomesitylene, 3,7-diamino-2,8-dimethyldiphenylsulfone and a mixture thereof, and a dianhydride selected from the group consisting of pyromellitic dianhydride, 3,3',4,4'-diphenylsulfone tetracarboxylic dianhydride, 3 , 3',4,4'-biphenyl tetracarboxylic dianhydride, 4,4'-(2,2,2-trifluoro-1-(trifluoromethyl)ethylidine)bis(1,2-benzene dicarboxylic acid dianhydride) and a mixture thereof.

15. The membrane of claim 3, in which the membrane is an asymmetric membrane.

16. The membrane of claim 15, in which the membrane is a hollow fiber.

* * * * *

UNITED STATES PATENT AND TRADEMARK OFFICE
CERTIFICATE OF CORRECTION

PATENT NO. : 7,018,445 B2 Page 1 of 1
APPLICATION NO. : 10/642407
DATED : March 28, 2006
INVENTOR(S) : John W. Simmons and Okan Max Ekiner It is certified that error appears in the above-identified patent and that said Letters Patent is hereby corrected as shown below:

In Column 19, line 7, replace the symbol "Ar" with the symbol --Ar'--.
In Column 21, line 59, replace the symbol "Ar" with the symbol --Ar'--.
In Column 22, line 23, replace the phrase "two of $X_1$" with the phrase
--two of X, $X_1$ --.

Signed and Sealed this

Twenty-second Day of August, 2006

JON W. DUDAS
*Director of the United States Patent and Trademark Office*